United States Patent
Chang et al.

(10) Patent No.: US 10,168,006 B2
(45) Date of Patent: Jan. 1, 2019

(54) BACKLIGHT MODULE

(71) Applicant: Au Optronics Corporation, Hsinchu (TW)

(72) Inventors: Chi-Sheng Chang, Taipei (TW); Chi-Tang Ma, Pingtung County (TW); Su-Yi Lin, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 528 days.

(21) Appl. No.: 14/924,725

(22) Filed: Oct. 28, 2015

(65) Prior Publication Data
US 2016/0363272 A1 Dec. 15, 2016

(30) Foreign Application Priority Data
Jun. 11, 2015 (TW) .............................. 104118905 A (51) Int. Cl.
*G02F 1/1335* (2006.01)
*F21K 99/00* (2016.01)

(52) U.S. Cl.
CPC .......... *F21K 9/56* (2013.01); *G02F 1/133609* (2013.01); *G02F 1/133603* (2013.01); *G02F 1/133605* (2013.01); *G02F 1/133606* (2013.01); *G02F 2001/133607* (2013.01); *G02F 2001/133614* (2013.01)

(58) Field of Classification Search
CPC .............................. F21K 9/56; G02F 1/133609
USPC ......................................................... 362/84
See application file for complete search history.

(56) References Cited

U.S. PATENT DOCUMENTS

| 7,695,150 | B2 | 4/2010 | Dejima et al. | |
|---|---|---|---|---|
| 9,347,650 | B2 | 5/2016 | Han et al. | |
| 2004/0169802 | A1 | 9/2004 | Yun et al. | |
| 2005/0073495 | A1* | 4/2005 | Harbers | G02F 1/133603 345/102 |
| 2005/0265029 | A1* | 12/2005 | Epstein | G02B 3/0056 362/339 |
| 2006/0255711 | A1 | 11/2006 | Dejima et al. | |

(Continued)

FOREIGN PATENT DOCUMENTS

| CN | 1873306 | 12/2006 |
|---|---|---|
| CN | 103487857 | 1/2014 |

(Continued)

*Primary Examiner* — Bryon T Gyllstrom
(74) *Attorney, Agent, or Firm* — JCIPRNET (57) ABSTRACT

A backlight module includes a light source and an optical film group. The light source is suitable for emitting a first light. The optical film group includes an optical wavelength conversion film, which is adapted to receive the first light and to convert the first light into a second light with different wavelength. The optical wavelength conversion film includes a first portion and a second portion, wherein a quantity of the first light received per unit area of the first portion of the optical wavelength conversion film is greater than a quantity of the first light received per unit area of the second portion of the optical wavelength conversion film. Furthermore, an optical wavelength conversion efficiency of the first portion of the optical wavelength conversion film with respect to the first light is smaller than an optical wavelength conversion efficiency of the second portion of the optical wavelength conversion film with respect to the first light.

18 Claims, 8 Drawing Sheets

(56) References Cited

U.S. PATENT DOCUMENTS

| | | | | |
|---|---|---|---|---|
| 2009/0003002 A1* | 1/2009 | Sato | ........................ | G02B 6/0043 |
| | | | | 362/341 |
| 2009/0116218 A1* | 5/2009 | Liu | ........................ | F21V 14/00 |
| | | | | 362/84 |
| 2009/0128914 A1* | 5/2009 | Lee | ........................ | G02B 5/0215 |
| | | | | 359/599 |
| 2010/0002414 A1* | 1/2010 | Meir | ........................ | G02B 6/0021 |
| | | | | 362/84 |
| 2010/0265694 A1* | 10/2010 | Kim | ........................ | G02B 6/0021 |
| | | | | 362/97.1 |
| 2011/0018012 A1* | 1/2011 | Tanaka | ........................ | F21V 3/00 |
| | | | | 257/89 |
| 2012/0033404 A1* | 2/2012 | Wu | ........................ | F21V 3/00 |
| | | | | 362/84 |
| 2012/0236531 A1* | 9/2012 | Lim | ........................ | G09F 9/33 |
| | | | | 362/84 |
| 2013/0009180 A1* | 1/2013 | Kim | ........................ | G02B 6/0026 |
| | | | | 257/89 |
| 2014/0009930 A1 | 1/2014 | Han et al. | | |
| 2014/0168942 A1* | 6/2014 | Kishimoto | ........................ | F21S 43/13 |
| | | | | 362/84 |
| 2016/0077381 A1* | 3/2016 | Ma | ........................ | G02F 1/133606 |
| | | | | 362/97.1 |

FOREIGN PATENT DOCUMENTS

| | | |
|---|---|---|
| CN | 103542280 | 1/2014 |
| CN | 104344291 | 2/2015 |
| TW | 201106061 | 2/2011 |
| TW | 201427893 | 7/2014 |

* cited by examiner

BACKLIGHT MODULE

CROSS-REFERENCE TO RELATED APPLICATION

This application claims the priority benefit of Taiwan application serial no. 104118905, filed on Jun. 11, 2015. The entirety of the above-mentioned patent application is hereby incorporated by reference herein and made a part of this specification.

BACKGROUND OF THE INVENTION

1. Field of the Invention

The invention generally relates to a backlight module.

2. Description of Related Art

In recent years, as electronic products become common, the display panel that provides the display function for the electronic products has come into focus among designers. There are various types of display panels that can be selected for use according to the designs of the electronic products. Some of them are not provided with a light-emitting function, and thus a backlight module needs to be disposed under the display panel to serve as a light source, so as to achieve the display function.

Such a backlight module usually includes an assembly frame, a light source, and a light guide plate. According to a relationship between the light source and the light guide plate, backlight modules may be categorized into two types, which are direct type backlight module and edge type backlight module. Take the direct type backlight module as an example, the light source and the light guide plate are installed in the assembly frame, wherein the light source is located under the light guide plate, such that the light emitted by the light source is guided by the light guide plate to be emitted out of the backlight module. In addition, the backlight module may use a variety of types of optical films as required, such as a prism film, a diffusion film, a brightness enhancement film (BEF), a polarizer film, and other suitable optical films. The optical film is disposed on two opposite sides of the light guide plate for adjusting a transmission path or distribution of the light emitted by the light source.

In order to eliminate the mura phenomenon, i.e. non-uniform brightness distribution, of the display device that uses the backlight module, the backlight module may use a perforated reflective film having high reflectivity to adjust the transmission path and distribution of the light emitted by the light source. The perforated reflective film has a plurality of perforations, and the number or area of the perforations differs between different regions so as to differentiate the light transmission amounts in these regions. For example, fewer or smaller perforations are formed in a region of the perforated reflective film corresponding to the top of the light source, so as to reduce the light transmission amount. In contrast thereto, more or larger perforations are formed in another region of the perforated reflective film not corresponding to the light source so as to increase the light transmission amount. Accordingly, the light emitted by the light source first passes through the perforated reflective film for adjusting the distribution profile before being transmitted outward, by which the uniformity of the light is improved.

In addition, for the backlight module to achieve wide color gamut (WCG), the backlight module may use blue light emitting diodes (LED) accompanied with a quantum dot enhancement film (QDEF). The quantum dot enhancement film converts part of the light emitted by the light source into a light having a different wavelength. For example, partial blue light is converted into a yellow light, and then the two lights having different wavelengths are mixed to produce a white light. Due to the perforated reflective film disposed in the backlight module, there is more light reflection between the quantum dot enhancement film and the region with fewer perforations of the perforated reflective film (i.e. the region corresponding to the top of the light source). As a result, in the region above the light source, more light is converted into the yellow light, which causes the overall light-emitting color of the backlight module to be non-uniform, and this phenomenon is called color shift.

SUMMARY OF THE INVENTION

The invention provides a backlight module, which can effectively eliminate color shift and has a uniform light-emitting color.

According to an embodiment of the invention, the backlight module includes a light source and an optical film group. The light source is suitable for emitting a first light. The optical film group includes an optical wavelength conversion film, which is adapted to receive the first light and to convert the first light into a second light with different wavelength. The optical wavelength conversion film includes a first portion and a second portion, wherein a quantity of the first light received per unit area of the first portion of the optical wavelength conversion film is greater than a quantity of the first light received per unit area of the second portion of the optical wavelength conversion film. In addition, an optical wavelength conversion efficiency of the first portion of the optical wavelength conversion film with respect to the first light is smaller than an optical wavelength conversion efficiency of the second portion of the optical wavelength conversion film with respect to the first light.

According to an embodiment of the invention, the backlight module includes a light source and an optical film group. The light source is suitable for emitting a first light. The optical film group includes an optical wavelength conversion film, which is adapted to receive the first light, and the optical wavelength conversion film includes a plurality of optical wavelength converters for converting the first light into a second light with different wavelength. The optical wavelength conversion film includes a first portion and a second portion, wherein a quantity of the first light received per unit area of the first portion of the optical wavelength conversion film is greater than a quantity of the first light received per unit area of the second portion of the optical wavelength conversion film. In addition, an amount of the optical wavelength converters contained per unit area of the first portion of the optical wavelength conversion film is less than an amount of the optical wavelength converters contained per unit area of the second portion of the optical wavelength conversion film.

In order to make the aforementioned features and advantages of the present invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings

FIG. 5A through FIG. 8B respectively illustrate a backlight module according to several embodiments of the invention.

DESCRIPTION OF THE EMBODIMENTS

The invention can adjust an optical wavelength conversion efficiency in a specific region of an optical wavelength conversion film through various possible means, so as to lower a probability for the light in the specific region from being converted into other colors. For instance, by reducing a thickness of the optical wavelength conversion film in the specific region, by forming a plurality of openings on the specific region of the optical wavelength conversion film, or by lowering a concentration of optical wavelength converters in the specific region of the optical wavelength conversion film, etc.; in other words, the aforementioned effect can, for example, be achieved by reducing an amount of the optical wavelength converters contained per unit area in the specific region of the optical wavelength conversion film. Herein, the said 'unit area' includes the optical wavelength conversion film itself and regions that are removed due to the formation of openings. Namely, the amount of the optical wavelength converters contained per unit area can be reduced by forming openings on the optical wavelength conversion film.

The following contents further describe the specific embodiments of the various techniques mentioned in above.

Figure 1A:
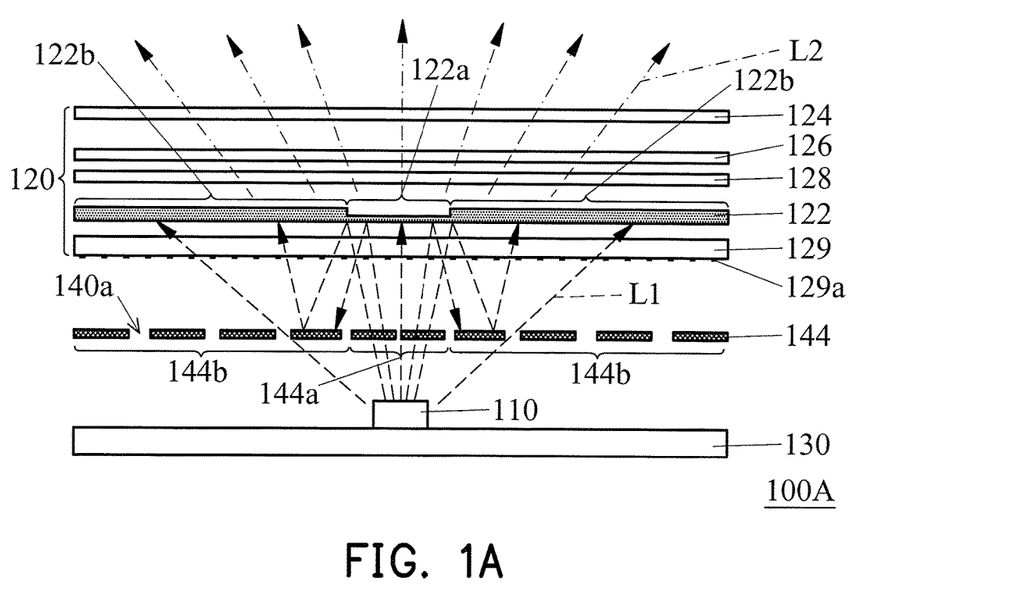
FIG. 1A illustrates a backlight module according to an embodiment of the invention.
Figure 1B:
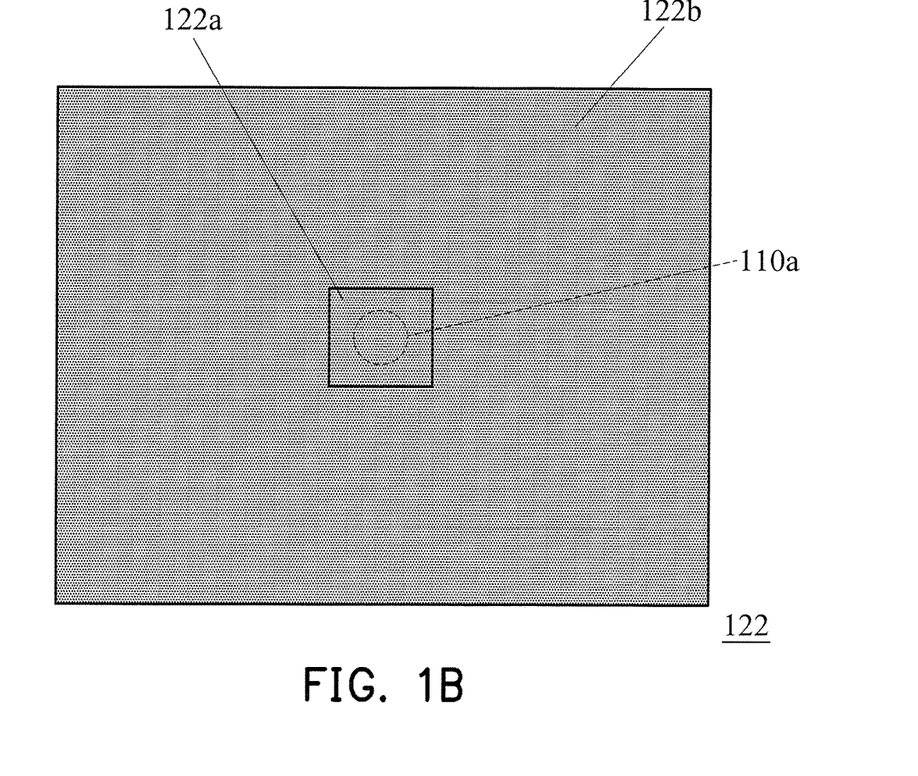
FIG. 1B is a top view illustrating an optical wavelength conversion film of FIG. 1A.

FIG. 1A illustrates a backlight module according to an embodiment of the invention. FIG. 1B is a top view illustrating an optical wavelength conversion film of FIG. 1A. As shown in FIG. 1A, a backlight module 100A of the present embodiment includes a light source 110 and an optical film group 120. The light source 110 is suitable for emitting a first light L1; for instance, the light source 110 is a blue light emitting diode, and the first light L1 being emitted is a blue light. In addition, the light source 110 can be disposed on a substrate 130, wherein the substrate 130 is, for example, an assembly frame or other suitable circuit board, ceramic substrate or so forth, but the invention does not intend to limit the type of the substrate 130 or whether the substrate 130 is to be disposed or not. In addition, although only one light source 110 is being illustrated in the backlight module 100A of FIG. 1A, the backlight module 100A can substantially include a plurality of light sources 110 which are arranged into an array, strips or other possible layout. The invention does not intend to limit the amount and the configuration means of the light source 110.

The backlight module 100A adjusts the light output by disposing an optical film group 120 on the light source 110. In order to improve a wide color gamut performance of the backlight module 100A, the optical film group 120 of the present embodiment includes an optical wavelength conversion film 122, which is, for example, a quantum dot enhancement film (QDEF) configured to receive the first light L1 and to convert the first light L1 into a second light L2 with different wavelength. For instance, if the first light L1 is a blue light, then a portion of the blue light may be converted by the optical wavelength conversion film 120 into a yellow light with different wavelength, and the blue light can be mixed with the yellow light to form a white light, which is to emitted out of the backlight module 100A. In addition, the optical film group 120 of the present embodiment, in addition to having the optical wavelength conversion film 122, may further include other suitable optical films, such as a dual brightness enhancement film 124, a prism film 126 and a diffusion film 128 located above the optical wavelength conversion film 122 and a diffusion film 129 located below the optical wavelength conversion film 122. On the other hand, there may also include dot patterns or other designs with light modulation effect on a surface of any optical film. For instance, the diffusion film 129 located below the optical wavelength conversion film 122 may have the dot patterns 129a as shown in FIG. 1A, so as to provide better light diffusion effect.

Certainly, the invention does not intend to limit the type of the optical wavelength conversion film 120. In other not shown embodiment, the optical wavelength conversion film may be an optical film with doped phosphors which can also be used to convert a wavelength of light. In addition, the amount, the type and the composition of the optical film of the invention may all be adjusted based on the practical needs, and thus are not limited by the schema of the present embodiment.

In the present embodiment, the backlight module 100A further includes an optical control film 144 for adjusting a distribution profile of the first light L1 emitted by the light source 110. The optical control film 144 is disposed between the optical film group 120 and the light source 110, and a light transmission amount of a first portion 144a of the optical control film 144 is different from a light transmission amount of a second portion 144b of the optical control film 144. More specifically, the optical control film 144 is a perforated reflective film with high reflectivity, and has a plurality of perforations 140a distributed thereon. An amount or area of perforations 140a having by the first portion 144a of the optical control film 144 is not equal to an amount or area of perforations 140a having by the second portion 144b of the optical control film 144, and thus the light transmission amount of the first portion 144a of the optical control film 144 is different from the light transmission amount of the second portion 144b of the optical control film 144.

In the present embodiment, the first portion 144a of the optical control film 144 is corresponded to the light source 110 (e.g., located right above the light source 110), and the first portion 144a of the optical control film 144 has the lower light transmission amount. Relatively, the second portion 144b of the optical control film 144 is corresponded to the region outside of the light source 110 and surrounds the first portion 144a, and the second portion 144b of the optical control film 144 has the higher light transmission amount. That is, the optical control film 144 (e.g., the first portion 144a) corresponding to a region above the light source 110 has the smaller area or lesser amount of perforations 140a with, so as to provide the lower light transmission amount; and the optical control film 144 (e.g., the second portion 144b) corresponding to a region outside of the light source 110 has the greater area or larger amount of perforations 140a, so as to provide the higher light transmission amount. As such, the first light L1 emitted by the light source 110, after being adjusted on a distribution profile thereof by the optical control film 144, is transmitted to the optical film group 120, so as to improve a uniformity of the light in subsequence.

However, since the area or the amount of perforations 140a in the first portion 144a of the optical control film 144 is smaller, the first light L1 can be easily reflected between the first portion 144a of the optical control film 144 and the optical wavelength conversion film 122. In other words, more of the first light L1 will enter into the optical wavelength conversion film 122 at the region (e.g., above the light source 110) corresponding to the first portion 144a of the optical control film 144.

Referring to FIG. 1A and FIG. 1B, the optical wavelength conversion film 122 of the present embodiment includes a first portion 122a and a second portion 122b, wherein the first portion 122a of the optical wavelength conversion film 122 is corresponded to the first portion 144a of the optical control film 144, and the second portion 122b of the optical wavelength conversion film 122 is located outside of the first portion 122a and thus is namely corresponded to the second portion 144b of the optical control film 144. In other words, the first portion 122a of the optical wavelength conversion film 122 of the present embodiment is correspond to the region right above the light source 110, wherein a vertical projection of the light source 110 on the optical wavelength conversion film 122 (e.g., a dashed line region 110a shown in FIG. 1B) is partially overlapped or completely overlapped with the first portion 122a of the optical wavelength conversion film 122. As described in the above, because more of the first light L1 is reflected between the first portion 122a of the optical wavelength conversion film 122 and the first portion 144a of the optical control film 144, a quantity of the first light L1 received per unit area of the first portion 122a of the optical wavelength conversion film 122 is greater than a quantity of the first light L1 received per unit area of the second portion 122b of the optical wavelength conversion film 122.

In view of the condition that more of the first light L1 will enter into the first portion 122a of the optical wavelength conversion film 122, a thickness of the first portion 122a of the optical wavelength conversion film 122 is reduced in the present embodiment, so that the thickness of the first portion 122a of the optical wavelength conversion film 122 is thinner than a thickness of the second portion 122b of the optical wavelength conversion film 122. As such, the amount of the optical wavelength converters contained per unit area of the first portion 122a will be less than the amount of optical wavelength converters contained per unit area of the second portion 122b. In other words, an optical wavelength conversion efficiency of the first portion 122a of the optical wavelength conversion film 122 with respect to the first light L1 is smaller than an optical wavelength conversion efficiency of the second portion 122b of the optical wavelength conversion film 122 with respect to the first light L1. Herein, the optical wavelength conversion efficiency of the optical wavelength conversion film 122 with respect to the first light L1 can be defined as a ratio between a light intensity of the second light L2 being outputted and a light intensity of the first light L1 being inputted per unit area of the optical wavelength conversion film 122.

In view of the above, even though more of the first light L1 will enter into the first portion 122a of the optical wavelength conversion film 122, but since the thickness of the first portion 122a of the optical wavelength conversion film 122 is thinner, the optical wavelength conversion efficiency thereof with respect to the first light L1 would be smaller than the optical wavelength conversion efficiency of the second portion 122b, which has the thicker thickness, with respect to the first light L1, and thus a ratio of the second light L2 being outputted by the first portion 122a and the second portion 122b can be adjusted, so as to solve a problem of having uneven overall light-emitting color (color shift) in the backlight module.

Certainly, in other embodiment of the invention, the first portion 122a of the optical wavelength conversion film 122 may have a different shape depending on the amount and the configuration of the light source 110 or design requirements. Those skilled in the art should be able to adjust the shape of the first portion 122a based on the descriptions disclosed in the invention so as to fulfil different requirements.

Figure 2A:
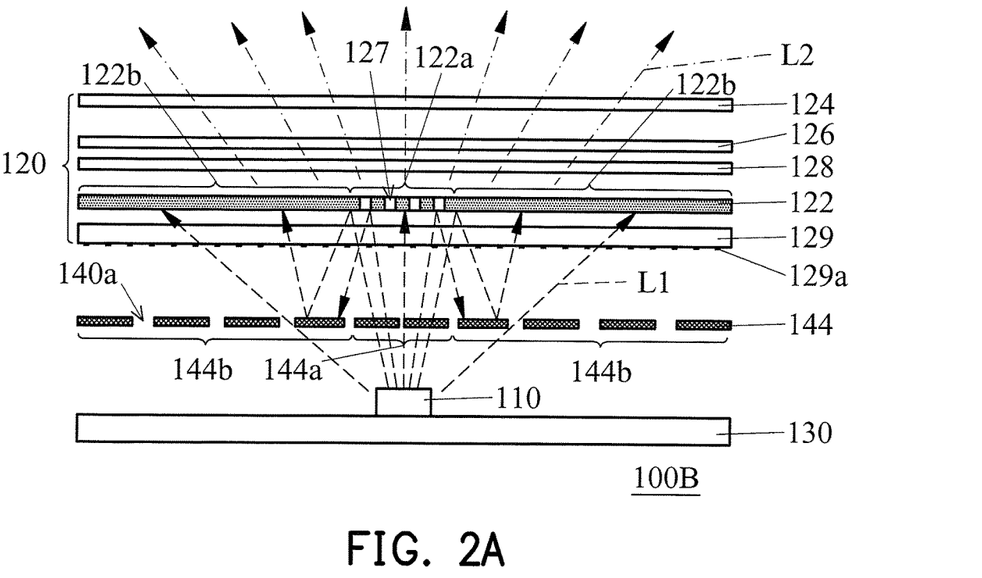
FIG. 2A illustrates a backlight module according to another embodiment of the invention.
Figure 2B:
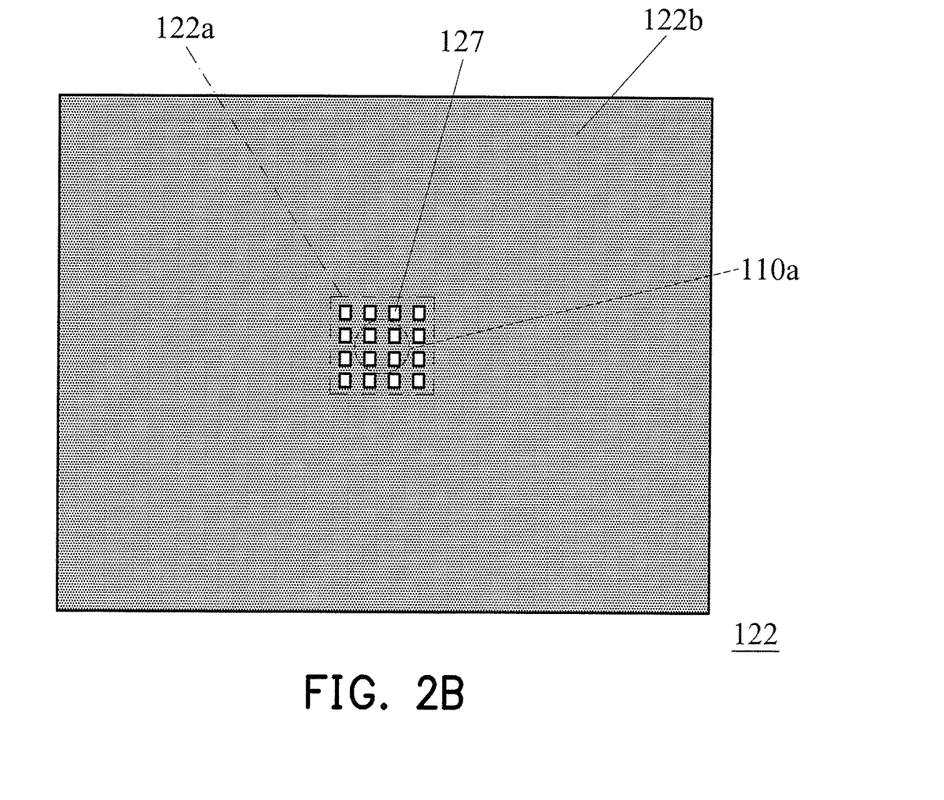
FIG. 2B is a top view illustrating an optical wavelength conversion film of FIG. 2A.

FIG. 2A illustrates a backlight module according to another embodiment of the invention. FIG. 2B is a top view illustrating an optical wavelength conversion film of FIG. 2A. A backlight module 100B of the present embodiment is similar to the backlight module 100A of the previous embodiment, in which the same or similar elements are designated by the same reference numerals so as to facilitate the understanding. Descriptions regarding the same or similar elements can be referred back to the previous embodiment, and thus will not be repeated.

A main difference between the backlight module 100B of the present embodiment and the backlight module 100A of the previous embodiment lies in that a different method is being used to lower the optical wavelength conversion efficiency of the first portion 122a of the optical wavelength conversion film 122, so as to lower the probability for the first light L1 that enters into the first portion 122a from being converted into the second light L2. More specifically, a plurality of openings 127 is being formed in the first portion 122a of the optical wavelength conversion film 122 of the present embodiment. In other words, the amount of optical wavelength converters contained per unit area of the optical wavelength conversion film 122 is reduced by removing a portion of the optical wavelength conversion film 122.

As a result, even though more of the first light L1 will enter into the first portion 122a of the optical wavelength conversion film 122, but since the first portion 122a of the optical wavelength conversion film 122 has the openings 127, the first light L1 passing through the openings 127 will not be converted into the second light L2. That is, in the optical wavelength conversion film 122, the optical wavelength conversion efficiency of the first portion 122a with respect to the first light L1 will be smaller than the optical wavelength conversion efficiency of the second portion 122b with respect to the first light L1, and thus the ratio of the second light L2 being outputted by the first portion 122a and the second portion 122b can be adjusted so as to solve the problem of having uneven overall light-emitting color (color shift) in the backlight module.

Certainly, in other embodiment of the invention, the openings 127 are not limited to be only formed in the first portion 122a of the optical wavelength conversion film 122. For instance, the openings 127 can simultaneously be formed in the first portion 122a and the second portion 122b of the optical wavelength conversion film 122, and the first portion 122a and the second portion 122b can respectively have different amounts or sizes of the openings 127, so as to adjust the optical wavelength conversion efficiencies of the first portion 122a and the second portion 122b with respect to the first light L1.

Figure 3A:
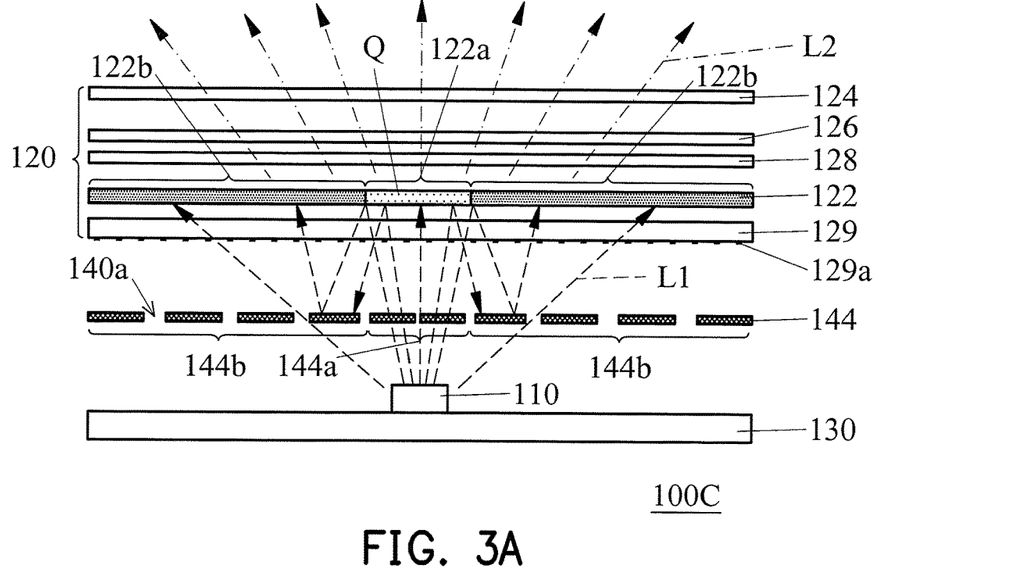
FIG. 3A illustrates a backlight module according to another embodiment of the invention.
Figure 3B:
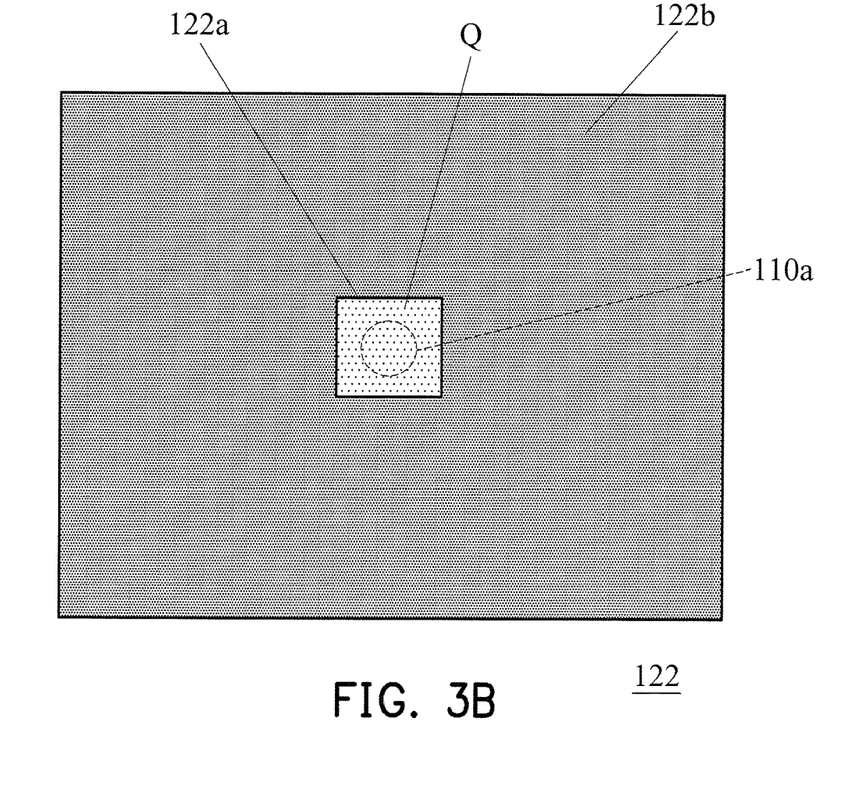
FIG. 3B is a top view illustrating an optical wavelength conversion film of FIG. 3A.

FIG. 3A illustrates a backlight module according to another embodiment of the invention. FIG. 3B is a top view illustrating an optical wavelength conversion film of FIG. 3A. A backlight module 100C of the present embodiment is similar to the backlight module 100A of the previous embodiment, in which the same or similar elements are designated by the same reference numerals so as to facilitate the understanding. Descriptions regarding the same or similar elements can be referred back to the previous embodiment, and thus will not be repeated.

A main difference between the backlight module 100C of the present embodiment and the backlight module 100A of the previous embodiment lies in that a different method is being used to lower the optical wavelength conversion efficiency of the first portion 122a of the optical wavelength conversion film 122, so as to lower the probability for the first light L1 that enters into the first portion 122a from being converted into the second light L2. More specifically, the optical wavelength converters contained by the optical wavelength conversion film 122 of the present embodiment are, for example, a plurality of quantum dots Q, and a concentration of quantum dots Q in the first portion 122a of the optical wavelength conversion film 122 is less than a concentration of quantum dots Q in the second portion 122b of the optical wavelength conversion film 122.

Consequently, the amount of optical wavelength converters (quantum dots Q) contained per unit area of the first portion 122a of the optical wavelength conversion film 122 is less than the amount of optical wavelength converters (quantum dots Q) contained per unit area the second portion 122b of the optical wavelength conversion film 122. Therefore, even though more of the first light L1 will enter into the first portion 122a of the optical wavelength conversion film 122, but since the amount of optical wavelength converters (quantum dots Q) contained per unit area of the first portion 122a is lesser, the optical wavelength conversion efficiency of the first portion 122a of the optical wavelength conversion film 122 with respect to the first light L1 will be smaller than the optical wavelength conversion efficiency of the second portion 122b of the optical wavelength conversion film 122 with respect to the first light L1, and thus the ratio of the second light L2 being outputted by the first portion 122a and the second portion 122b can be adjusted so as to solve the problem of having uneven overall light-emitting color (color shift) in the backlight module.

Figure 4A:
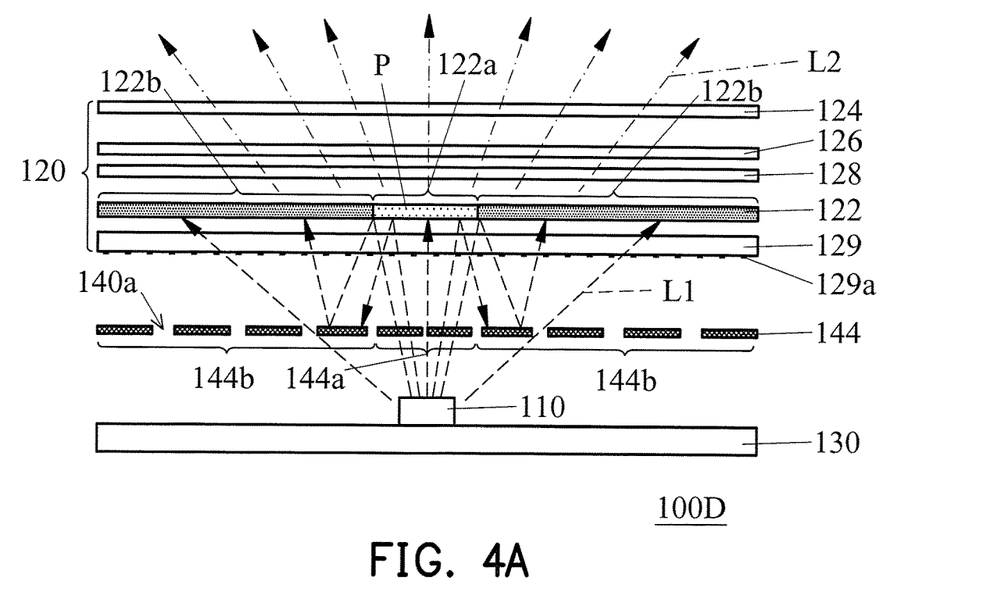
FIG. 4A illustrates a backlight module according to still another embodiment of the invention.
Figure 4B:
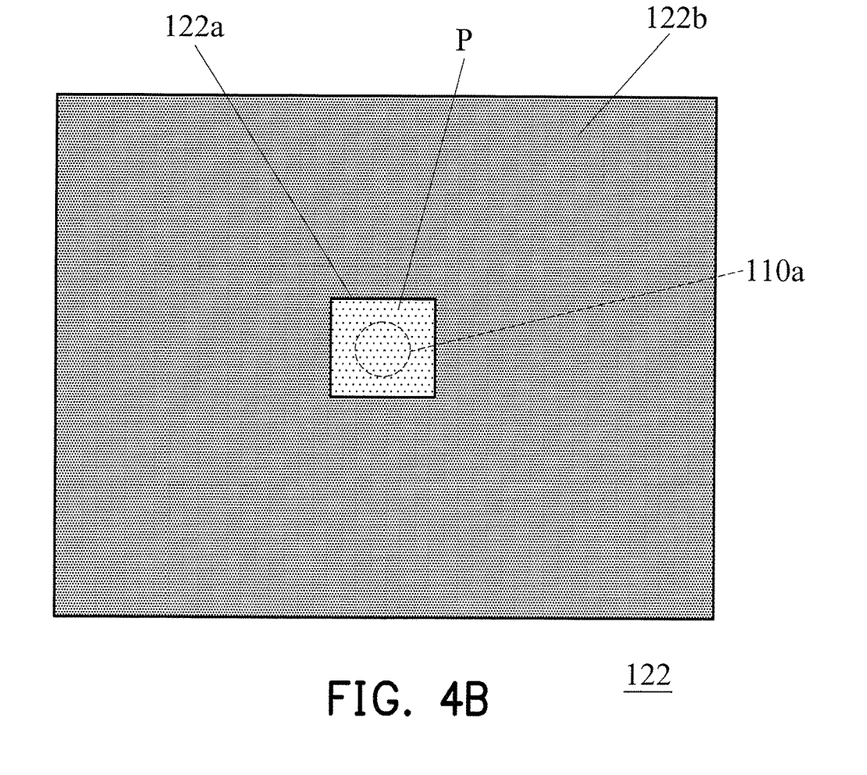
FIG. 4B is a top view illustrating an optical wavelength conversion film of FIG. 4A.

FIG. 4A illustrates a backlight module according to still another embodiment of the invention. FIG. 4B is a top view illustrating an optical wavelength conversion film of FIG. 4A. A backlight module 100D of the present embodiment is similar to the backlight module 100C of the previous embodiment, in which the same or similar elements are designated by the same reference numerals so as to facilitate the understanding. Descriptions regarding the same or similar elements can be referred back to the previous embodiment, and thus will not be repeated.

A main difference between the backlight module 100D of the present embodiment and the backlight module 100C of the previous embodiment lies in that the optical wavelength converters of the optical wavelength conversion film 122 of the present embodiment include a plurality of phosphors P, and a concentration of the phosphors P in the first portion 122a of the optical wavelength conversion film 122 is less than a concentration of the phosphors P in the second portion 122b of the optical wavelength conversion film 122. As such, the amount of optical wavelength converters (phosphors P) contained per unit area of the first portion 122a of the optical wavelength conversion film 122 is less than the amount of optical wavelength converters (phosphors P) contained per unit area of the second portion 122b of the optical wavelength conversion film 122. Therefore, even though more of the first light L1 will enter into the first portion 122a of the optical wavelength conversion film 122, but since the amount of the optical wavelength converters (phosphors P) contained per unit area of the first portion 122a is lesser, the optical wavelength conversion efficiency of the first portion 122a of the optical wavelength conversion film 122 with respect to the first light L1 will be smaller than the optical wavelength conversion efficiency of the second portion 122b of the optical wavelength conversion film 122 with respect to the first light L1, and thus the ratio of the second light L2 being outputted by the first portion 122a and the second portion 122b can be adjusted so as to solve the problem of having uneven overall light-emitting color (color shift) in the backlight module.

The invention, in addition to using the optical control film 144 as shown in FIG. 1 through FIG. 4 to adjust the distribution profile of the first light L1 emitted by the light source 110, may also use other element with similar effects, such as a lens, to replace the optical control film 144.

Figure 5A:
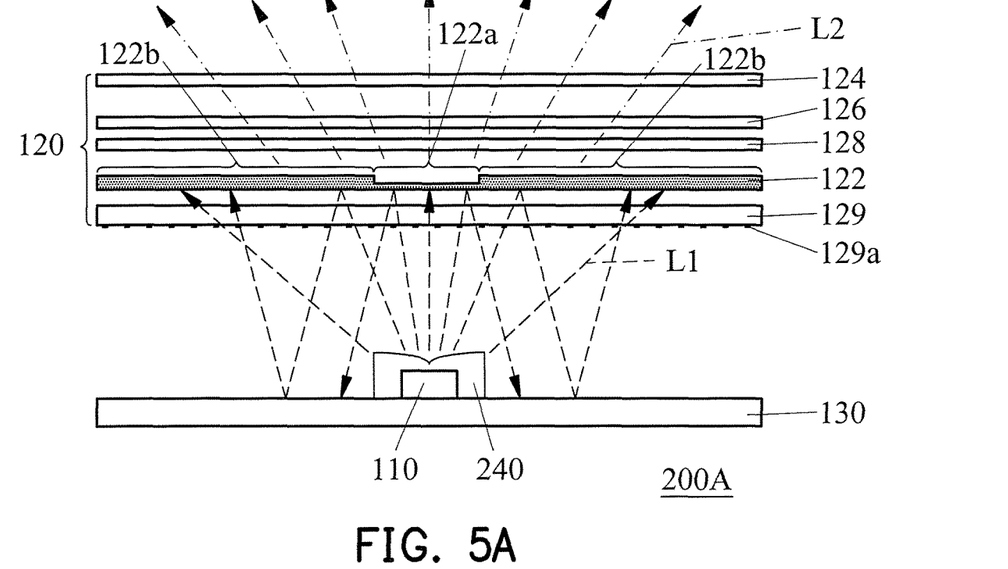
Figure 5B:
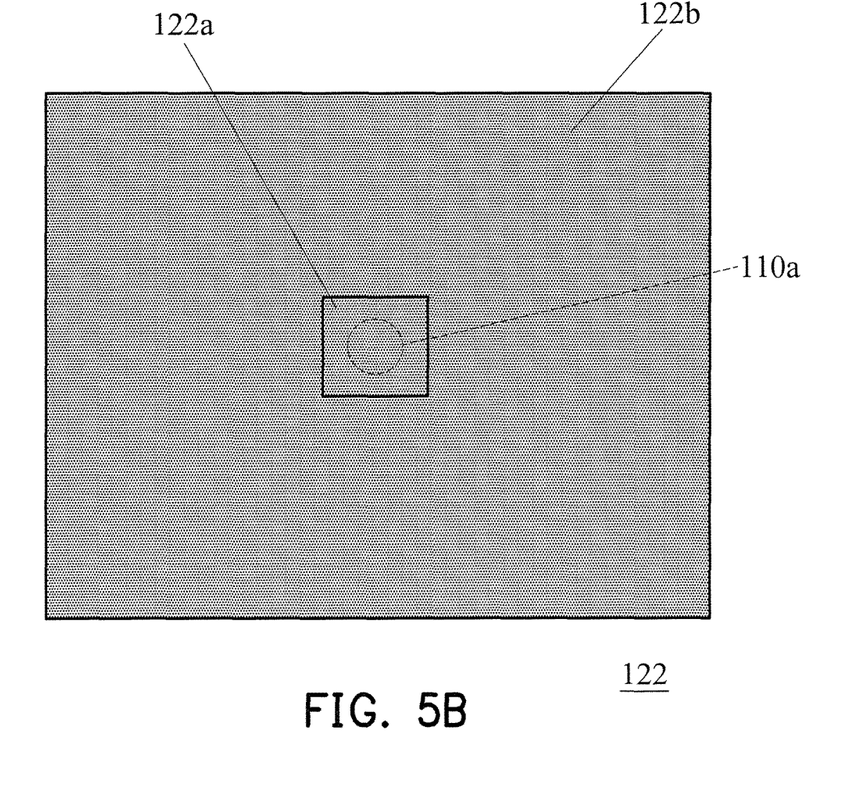

FIG. 5 illustrates a backlight module according to another embodiment of the invention. A backlight module 200A of the present embodiment is similar to the backlight module 100A of the previous embodiment, in which the same or similar elements are designated by the same reference numerals so as to facilitate the understanding. Descriptions regarding the same or similar elements can be referred back to the previous embodiment, and thus will not be repeated.

A main difference between the backlight module 200A of the present embodiment and the backlight module 100A of the previous embodiment lies in that the optical control film 144 is being replaced by a lens 240. The lens 240 is disposed between the optical wavelength conversion film 122 and the light source 110 to reflect or refract the first light emitted by the light source 110. Specifically, the lens 240 of the present embodiment is disposed on the substrate 130 and covers on the light source 110. The lens 240 is, for example, a transmissive lens or a reflective lens, but the invention does not limit the type of the lens 240. Since the lens 240 can be used to reflect or refract the first light L1, it can provide technical effects similar to the optical control film 144 in the previous embodiments, thereby improving a distribution uniformity of the first light L1.

Similar to the embodiments as described in the above, in the present embodiment, a reflection effect produced by the first light L1 between the optical wavelength conversion film 122 and the lens 240 (e.g., at a region corresponding to the above of the light source 110) is different from a reflection effect produced by the first light L1 between the optical wavelength conversion film 122 and other region around the lens 240. As such, through using the lens 240, the quantity of first light L1 received by different regions of the optical wavelength conversion film 122 would be different, such that the quantity of the first light L1 received per unit area of the first portion 122a of the optical wavelength conversion film 122 would be greater than the quantity of the first light L1 received per unit area of the second portion 122b of the optical wavelength conversion film 122, and thus the backlight module 200A produces a color shift at a location corresponding to the light source 110.

In view of the above, similar to the previous embodiments of FIG. 1A and FIG. 1B, the optical wavelength conversion film 122 is being used in the present embodiment, wherein the thickness of the first portion 122a of the optical wavelength conversion film 122 is reduced so that the thickness of the first portion 122a of the optical wavelength conversion film 122 is thinner than the thickness of the second portion 122b of the optical wavelength conversion film 122. As such, the amount of optical wavelength converters contained per unit area of the first portion 122a is less than the amount of optical wavelength converters contained per unit area of the second portion 122b. In other words, the optical wavelength conversion efficiency of the first portion 122a of the optical wavelength conversion film 122 with respect to the first light L1 is smaller than the optical wavelength conversion efficiency of the second portion 122b of the optical wavelength conversion film 122 with respect to the first light L1. Herein, the optical wavelength conversion efficiency of the optical wavelength conversion film 122 with respect to the first light L1 can be defined as a ratio between the light intensity of the second light L2 being outputted and the light intensity of the first light L1 being inputted per unit area of the optical wavelength conversion film 122.

In view of the above, even though more of the first light L1 will enter into the first portion 122a of the optical wavelength conversion film 122, but since the thickness of the first portion 122a of the optical wavelength conversion film 122 is thinner, the optical wavelength conversion efficiency thereof with respect to the first light L1 will be smaller than the optical wavelength conversion efficiency of the second portion 122b, which has the thicker thickness, with respect to the first light L1, and thus the ratio of the second light L2 being outputted by the first portion 122a and the second portion 122b can be adjusted, so as to solve the problem of having uneven overall light-emitting color (color shift) in the backlight module.

Certainly, the embodiment shown in FIG. 5 may also use other various possible means to adjust the optical wavelength conversion efficiency at a specific region of the optical wavelength conversion film so as to lower the probability for the light in the specific region from being converted into other color lights. For instance, in several embodiments as described in the above, technical means such as forming a plurality of openings at the specific region of the optical wavelength conversion film or lowering the concentration of optical wavelength converters in the specific region of the optical wavelength conversion film (as shown in FIG. 2 through FIG. 4) may also be transferred and used in the embodiment of FIG. 5.

Figure 6A:
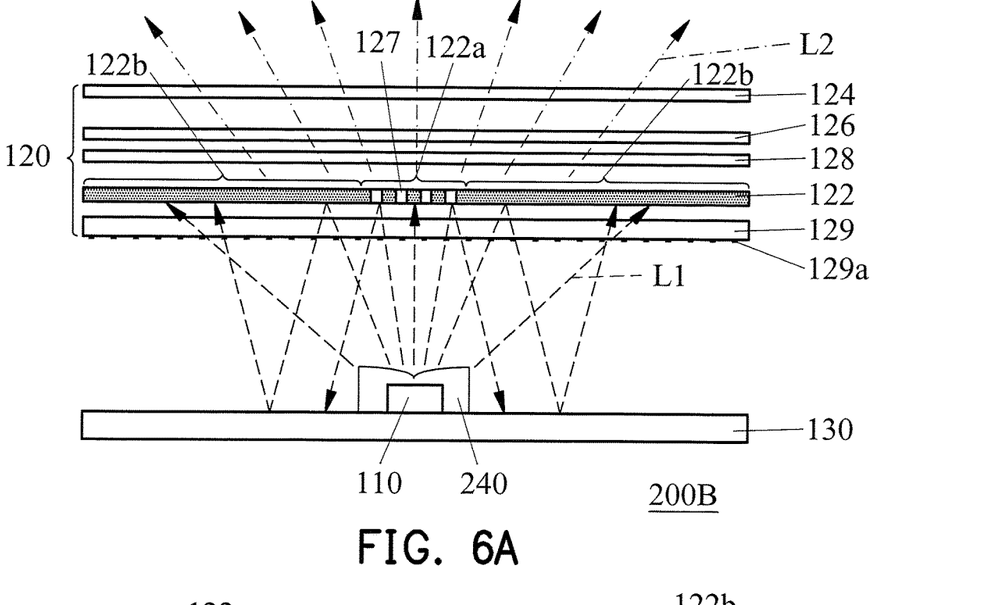
Figure 6B:
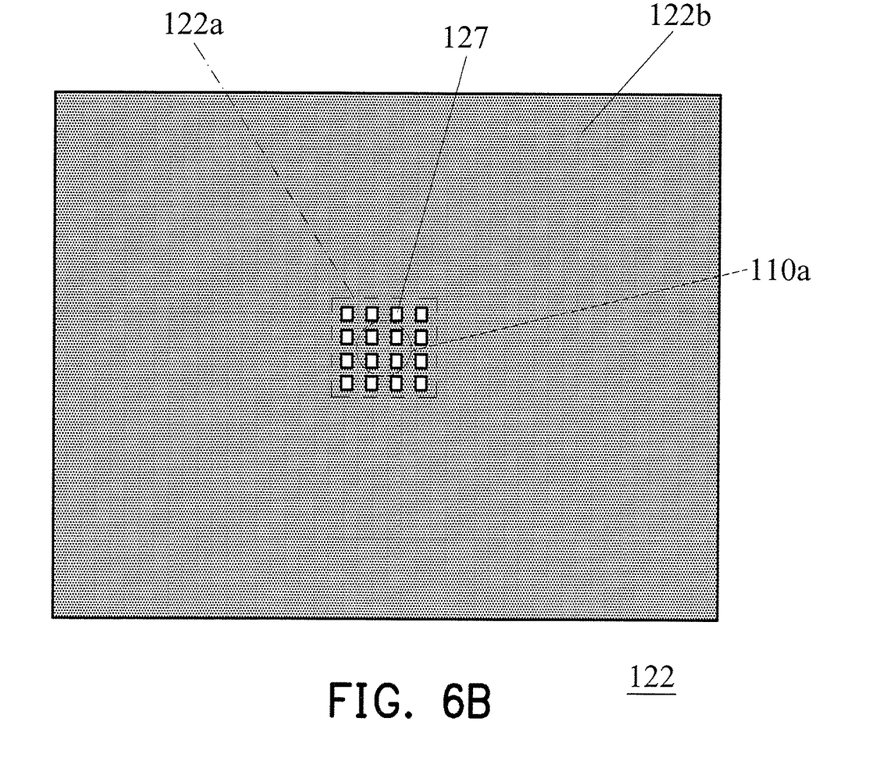
Figure 7A:
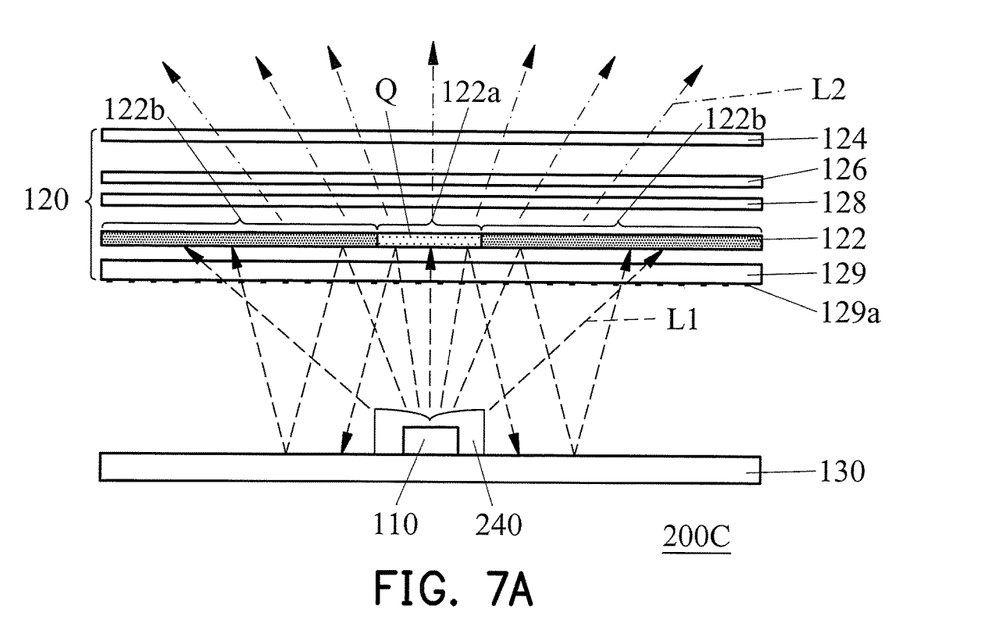
Figure 7B:
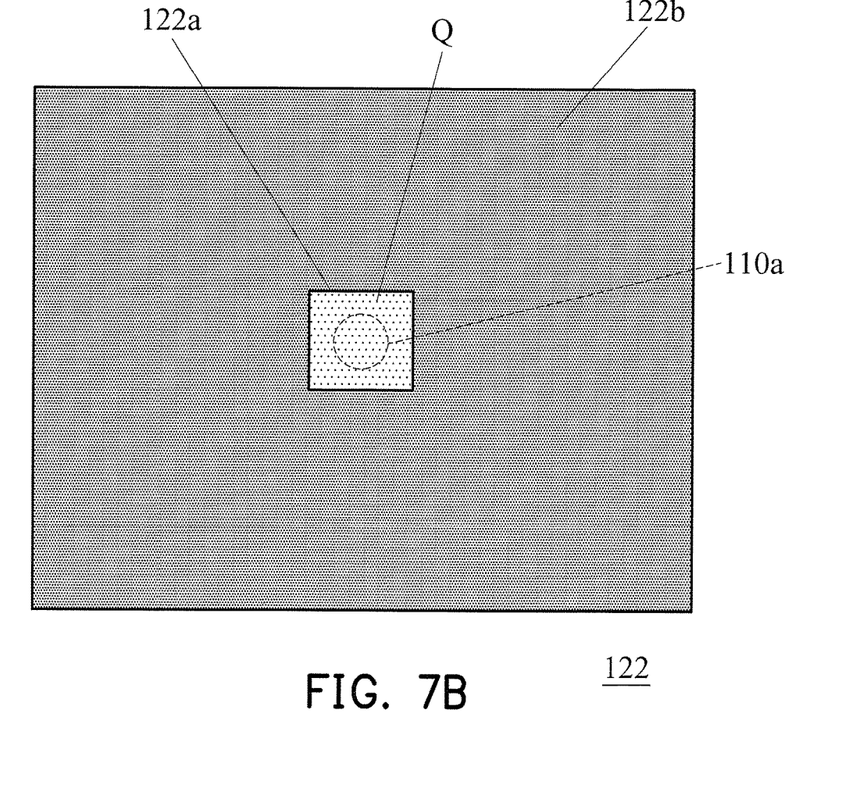
Figure 8A:
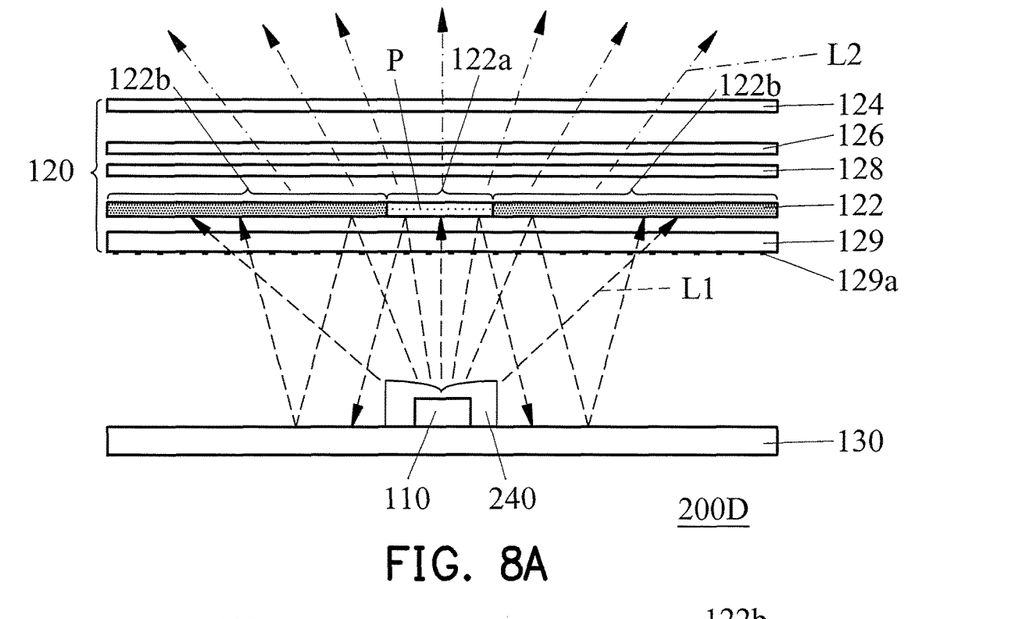
Figure 8B:
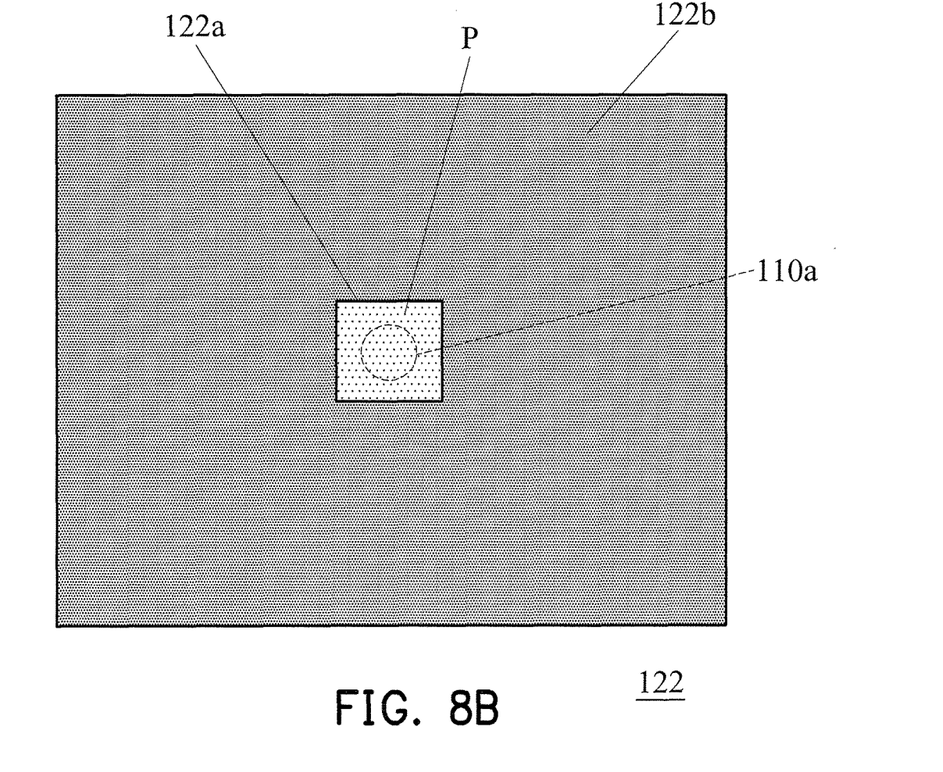

FIG. 6 through FIG. 8 respectively illustrate a backlight module according to several embodiments of the invention, which respectively use the optical wavelength conversion film 122 as shown in FIG. 2 through FIG. 4 to replace the optical wavelength conversion film 122 of FIG. 5, so as to achieve the similar technical effects. From another point of view, a backlight module 200B of FIG. 6 is similar to the backlight module 100B of FIG. 2, whereby a main difference lies in that the backlight module 200B of FIG. 6 uses the lens 240 to replace the optical control film 144 of the backlight module 100B of FIG. 2. In addition, a backlight module 200C of FIG. 7 is similar to the backlight module 100C of FIG. 3, whereby a main difference lies in that the backlight module 200C of FIG. 7 uses the lens 240 to replace the optical control film 144 of the backlight module 100C of FIG. 3. Likewise, a backlight module 200D of FIG. 8 is similar to the backlight module 100D of FIG. 4, whereby a main difference lies in that the backlight module 200D of FIG. 8 uses the lens 240 to replace the optical control film 144 of the backlight module 100D of FIG. 4. In these embodiments, the same or similar elements are designated by the same reference numerals so as to facilitate the understanding. Descriptions regarding the same or similar elements can be referred back to the previous embodiment, and thus will not be repeated.

In summary, the backlight module of the invention can lower the probability for the light in the specific region from being converted into other color lights by adjusting the optical wavelength conversion efficiency in the specific region of the optical wavelength conversion film. The specific approach is, for example, lowering the amount of optical wavelength converters contained per unit area of the specific region of the optical wavelength conversion film. As such, the specific region of the optical wavelength conversion film can be prevented from converting and outputting more color lights due to receiving more lights, thereby improving the problem of having uneven overall light-emitting color (color shift) in the backlight module.

Certainly, various designs of the optical wavelength conversion film as described in several of the previous embodiments are merely provided as examples for illustration purposes. Those skilled in the art should be to combine or provide reasonably extend the contents of these embodiments with reference to the disclosure of the invention so as to satisfy various needs. For instance, the optical wavelength conversion film can be integrated with two or more than two of the following approaches, such as having a thinner thickness, having openings, changing the concentration of the optical wavelength converters and so forth; i.e., a specific region of the optical wavelength conversion film can be thinned or formed with a plurality of openings therein at the same time, or the concentration of the optical wavelength converters at the specific region can be further changed, or the concentration of the optical wavelength converters can even appear to have a gradient or be changed in a gradient.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A backlight module, comprising:
   a light source suitable for emitting a first light and have an optical axis; and
   an optical film group comprising an optical wavelength conversion film adapted to receive the first light and to convert the first light into a second light with different wavelength, the optical wavelength conversion film comprising a first portion and second portions, wherein the first portion of the optical wavelength conversion film is located in the optical axis of the light source, the second portions of the optical wavelength conversion films are respectively located in two sides of the optical axis of the light source, a quantity of the first light received per unit area of the first portion of the optical wavelength conversion film is greater than a quantity of the first light received per unit area of the second portions of the optical wavelength conversion film, and an optical wavelength conversion efficiency of the first portion of the optical wavelength conversion film with respect to the first light is smaller than an optical wavelength conversion efficiency of the second portions of the optical wavelength conversion film with respect to the first light.

2. The backlight module as recited in claim 1, further comprising:
an optical control film (OCF) disposed between the optical wavelength conversion film and the light source, wherein a light transmission amount of a first portion of the optical control film is different from a light transmission amount of a second portion of the optical control film, the first portion of the optical control film is corresponded to the first portion of the optical wavelength conversion film, and the second portion of the optical control film is corresponded to the second portions of the optical wavelength conversion film.

3. The backlight module as recited in claim 1, further comprising:
a lens disposed between the optical wavelength conversion film and the light source to reflect or refract the first light.

4. The backlight module as recited in claim 1, wherein a thickness of the first portion of the optical wavelength conversion film is smaller than a thickness of the second portions of the optical wavelength conversion film.

5. The backlight module as recited in claim 1, wherein the first portion of the optical wavelength conversion film has a plurality of openings.

6. The backlight module as recited in claim 1, wherein the optical wavelength conversion film has a plurality of optical wavelength converters therein, and a concentration of the optical wavelength converters in the first portion of the optical wavelength conversion film is less than a concentration of the optical wavelength converters in the second portions of the optical wavelength conversion film.

7. The backlight module as recited in claim 6, wherein the optical wavelength converters comprise a plurality of quantum dots or a plurality of phosphors.

8. The backlight module as recited in claim 1, wherein the optical film group further comprises a diffusion film disposed between the optical wavelength conversion film and the light source, and a surface of the diffusion film comprises a plurality of dot patterns.

9. The backlight module as recited in claim 1, wherein a vertical projection of the light source on the optical wavelength conversion film overlaps with the first portion of the optical wavelength conversion film.

10. A backlight module, comprising:
a light source suitable for emitting a first light and have an optical axis; and
an optical film group comprising an optical wavelength conversion film adapted to receive the first light, the optical wavelength conversion film comprising a plurality of optical wavelength converters for converting the first light into a second light with different wavelength, the optical wavelength conversion film comprising a first portion and second portions, wherein the first portion of the optical wavelength conversion film is located in the optical axis of the light source, the second portions of the optical wavelength conversion films are respectively located in two sides of the optical axis of the light source, a quantity of the first light received per unit area of the first portion of the optical wavelength conversion film is greater than a quantity of the first light received per unit area of the second portions of the optical wavelength conversion film, and an amount of the optical wavelength converters contained per unit area of first portion of the optical wavelength conversion film is less than an amount of the optical wavelength converters contained per unit area of the second portions of the optical wavelength conversion film.

11. The backlight module as recited in claim 10, further comprising:
an optical control film (OCF) disposed between the optical wavelength conversion film and the light source, wherein a light transmission amount of a first portion of the optical control film is different from a light transmission amount of a second portion of the optical control film, the first portion of the optical control film is corresponded to the first portion of the optical wavelength conversion film, and the second portion of the optical control film is corresponded to the second portions of the optical wavelength conversion film.

12. The backlight module as recited in claim 10, further comprising:
a lens disposed between the optical wavelength conversion film and the light source to reflect or refract the first light.

13. The backlight module as recited in claim 10, wherein a thickness of the first portion of the optical wavelength conversion film is smaller than a thickness of the second portions of the optical wavelength conversion film.

14. The backlight module as recited in claim 10 wherein the first portion of the optical wavelength conversion film has a plurality of openings.

15. The backlight module as recited in claim 10, wherein the optical wavelength converters comprise a plurality of quantum dots, and a concentration of the quantum dots in the first portion of the optical wavelength conversion film is less than a concentration of the quantum dots in the second portions of the optical wavelength conversion film.

16. The backlight module as recited in claim 10, wherein the optical wavelength converters comprise a plurality of phosphors, and a concentration of the phosphors in the first portion of the optical wavelength conversion film is less than a concentration of the phosphors in the second portions of the optical wavelength conversion film.

17. The backlight module as recited in claim 10, wherein the optical film group further comprises a diffusion film disposed between the optical wavelength conversion film and the light source, and a surface of the diffusion film comprises a plurality of dot patterns.

18. The backlight module as recited in claim 10, wherein a vertical projection of the light source on the optical wavelength conversion film overlaps with the first portion the optical wavelength conversion film.

\* \* \* \* \*